United States Patent Office 3,065,056
Patented Nov. 20, 1962

3,065,056
METHOD OF PREPARING CYANOGEN
Marcellus J. Geerts, Evanston, Hillis O. Folkins, Crystal Lake, and Charles T. O'Malley, Chicago, Ill., assignors to The Pure Oil Company, Chicago, Ill., a corporation of Ohio
No Drawing. Filed Dec. 30, 1960, Ser. No. 79,536
8 Claims. (Cl. 23—151)

This invention relates to a new and improved process for the preparation of cyanogen by oxidation of hydrogen cyanide with an oxide of nitrogen having an oxidation state higher than nitric oxide, or by means of a mixture of nitric oxide (or a higher nitrogen oxide) and oxygen, in the presence of a catalyst prepared by impregnating a refractory oxide or mixed oxide support with an oxidation catalyst and calcining the catalyst composite to cause the oxidation catalyst to combine chemically with the support.

In Fierce and Sandner Patent 2,884,308, there is disclosed a process for the preparation of cyanogen by partial oxidation of hydrogen cyanide utilizing a higher nitrogen oxide or a combination of nitric oxide (or a higher nitrogen oxide) and oxygen at elevated temperatures with or without a catalyst. In the Fierce et al. patent, several catalysts, e.g., magnesium chloride, calcium chloride, and calcium oxide, supported on pumice, are disclosed as effective catalysts for the oxidation of hydrogen cyanide to cyanogen. While catalyst utilizing a pumice support were found to be fairly satisfactory from the standpoint of a high initial oxidation activity, they were found to have the following disadvantages:

(1) The promoter is readily lost from the pumice support because of the physical nature of the pumice, thus tending to produce a heterogeneous catalyst composition.

(2) Pumice is difficult to form into pellets, and in the granular form is substantially more susceptible to attrition.

(3) Catalysts utilizing a pumice support have been found to deteriorate rapidly both in activity and selectivity during extended use.

Other catalyst supports suggested in the aforementioned Fierce et al. patent, such as diatomaceous earth, produce catalysts of low activity. Other catalyst supports, such as activated alumina, produce catalysts of inherently high activity but very poor selectivity with the result that while the hydrogen cyanide is almost completely converted, it is almost completely oxidized to carbon dioxide and water rather than partially oxidized to cyanogen.

In the copending application of Hillis O. Folkins and Marcellus J. Geerts (Case 382), Serial Number 76,495, filed December 19, 1960, it is disclosed that catalysts of high activity, which are highly selective for oxidation of hydrogen cyanide to cyanogen, can be prepared by supporting alkali and alkaline earth metal oxides, hydroxides, halides, and decomposable salts of alkali and alkaline earth metals such as the nitrates, oxalates, carbonates, on a refractory oxide support having a B.E.T. surface area of about 5–60 m.$^2$/g. (square meters per gram), and activating the resulting catalyst. It is reported, however, that the temperature of oxidation of hydrogen cyanide with a nitrogen oxide utilizing such a catalyst must be carefully correlated with the surface area of the catalyst to obtain both a high conversion of hydrogen cyanide and a high yield of cyanogen. Correlation between oxidation temperature and catalyst surface area is inverse and the lower temperatures are used with high-surface-area catalysts.

One of the objects of this invention is to provide an improved catalytic process for the partial oxidation of hydrogen cyanide to cyanogen utilizing a nitrogen oxide as the oxidizing agent.

Another object of this invention is to provide an improved process for the partial oxidation of hydrogen cyanide to cyanogen using a nitrogen oxide as the oxidant in the presence of a catalyst which has been treated to render it more active and selective for formation of cyanogen.

A feature of this invention is the provision of an improved process for the partial oxidation of hydrogen cyanide to cyanogen utilizing nitrogen dioxide (or higher nitrogen oxides) or mixtures of nitric oxide (or higher nitrogen oxides) and oxygen as the oxidant in the presence of a high-surface-area refractory oxide, or mixed oxide support, having an oxidation catalyst chemically combined therewith.

Another feature of this invention is the provision of the process in which hydrogen cyanide is partially oxidized to cyanogen in high yield and selectivity utilizing nitrogen dioxide (or higher nitrogen oxides) or mixtures of nitric oxide (or higher nitrogen oxides) and oxygen as the oxidant, in the presence of a refractory oxide or mixed oxide support having a B.E.T. surface area greater than about 75 m.$^2$/g., and having an oxidation catalyst chemically combined through oxide linkages to the surface of the catalyst support.

Other objects and features of this invention will become apparent from time to time throughout the specification and the claims as hereinafter related.

This invention is based upon our discovery that hydrogen cyanide can be partially oxidized by nitrogen dioxide (or higher nitrogen oxides) or mixtures of nitric oxide (or other higher nitrogen oxides) and oxygen to yield cyanogen in substantially higher yields and selectivities than have been previously obtained, by utilizing an oxidation catalyst prepared by incorporating a metal oxide, hydroxide, or decomposable salt (e.g., nitrate, acetate, oxalate, carbonate, etc.) on a refractory oxide or mixed oxides support, such as silica, alumina, silica-alumina, etc., having a surface area greater than about 75 m.$^2$/g., followed by calcination of the catalyst composite to cause the metal compound to react chemically with the support. In the previous work of Fierce and Sandner, or Folkins and Geerts, mentioned above, various catalysts were used for promoting the partial oxidation of hydrogen cyanide by nitrogen oxides to yield cyanogen. Catalysts which were used consisted mainly of alkali metal oxides or halides, or alkaline earth metal oxides or halides, on various supports. Supports which have been used include pumice, kieselguhr, alumina, etc. The surface areas of the supports have ranged from about 0.5 to 60 m.$^2$/g. One of the earlier catalysts investigated consisted of magnesium oxide on pumice having a surface area of about 0.5 m.$^2$/g. This catalyst was used in the oxidation of hydrogen cyanide by nitrogen dioxide at a temperature of about 270°–290° C. Under these conditions, a yield of cyanogen was obtained of about 53% at a selectivity of 78%. This catalyst, however, was found to be susceptible to deterioration both in activity and selectivity, presumably because of an interaction of acidic components of the charge reactants, or of the reaction products, with the metal promoter of the catalyst. Using a similar catalyst, consisting of magnesium oxide on activated alumina, which had been treated to reduce the surface area to about 50 m.$^2$/g., a cyanogen yield of approximately 65% was obtained at a selectivity of about 65%, when used in the oxidation of hydrogen cyanide by nitrogen dioxide at 230°–260° C. This catalyst also suffered from deterioration of activity and selectivity. In addition, this catalyst was temperature-sensitive, with the result that it readily promoted complete combustion of hydrogen cyanide instead of partial oxidation to cyanogen.

We have found that the catalyzed oxidation of hydrogen cyanide to cyanogen using a nitrogen oxide oxidant will produce cyanogen in higher yields and higher selectivities over an extended period of time if a catalyst is used which has a high surface area and in which the oxidation promoter is chemically combined with the catalyst support. In preparing catalysts for use in accordance with this invention, we prefer to utilize gel-type refractory oxides or mixed oxides, having a surface area greater than 75 m.$^2$/g., which have not previously been calcined above about 370° C. and which still have incorporated within their structures an amount of water in excess of about 5% wt. Alternatively, we may utilize the undried hydrogels of these materials, which, as slurries or filter cakes, contain up to 85% wt. water or more. The refractory support materials which are used are high-surface-area refractory oxides having B.E.T. surface areas in excess of about 75 m.$^2$/g. Refractory materials which have these properties include silica gel, activated alumina, refractory mixed oxides gels, such as silica-alumina, silica-magnesia, silica-zirconia, silica-titania, silica-boria, etc. In the preparation of the catalysts used in our process, the hydrogel (which may have been dried to a water content not less than about 5% wt.) is mixed intimately with a metal promoter which is an oxide, hydroxide, or decomposable salt of metals of groups 1 and 2 of the periodic table, or of chromium, molybdenum, manganese, iron, or nickel. The intimate association of the promoter metal oxide, hydroxide or salt can be accomplished by any of the known methods of forming catalyst composites. However, we prefer to (1) slurry the gel into an aqueous solution containing the requisite amount of a water-soluble salt of the selected metal; (2) add ammonia or other base to the slurry to precipitate the hydroxide or oxide of the metal; and (3) filter the slurry to recover the composite catalyst material. The catalyst composite which is thus prepared is then calcined at a temperature of 260°–540° C. for a time sufficient to effect completion of reaction between the metal compound and the surface oxide or hydroxide groups in the refractory support. The catalyst which is thus produced is one in which the metal is chemically combined to the support through an oxide linkage. The final catalyst composition which is prepared in this manner contains the combined metal at a concentration of 0.5–15% wt. The catalyst which is thus prepared is used in the oxidation of hydrogen cyanide by nitrogen dioxide or mixtures of oxygen and nitric oxide or nitrogen dioxide at a temperature of about 100°–400° C. and is effective to produce cyanogen in substantially high yields and high selectivities over extended periods of operation.

In carrying out the oxidation of hydrogen cyanide by nitrogen dioxide or mixtures of nitrogen oxides and oxygen, the reaction conditions previously reported by Fierce and Sandner, or by Folkins and Geerts, can be followed. The reaction proceeds satisfactorily at atmospheric pressure although sub-atmospheric and super-atmospheric pressures can be used. In general, the mol ratio of hydrogen cyanide to the nitrogen oxide should be 2:1 or higher. It is understood, of course, that as the mol ratio of hydrogen cyanide to the nitrogen oxide is increased above the stoichiometric amounts necessary for the reaction, a point is reached where the yield of cyanogen decreases since excess hydrogen cyanide passes through the reaction zone unchanged. Where mixtures of nitrogen oxides with oxygen are used, a considerable excess of oxygen is utilized so that the by-product nitric oxide is continually reoxidized to form nitrogen dioxide for further reaction with hydrogen cyanide. Where nitrogen dioxide is used alone as the oxidant, mol ratios of hydrogen cyanide to nitrogen dioxide of 2–3:1 give satisfactory results, although the mol ratio may vary from as little as 0.5:1 to 20:1 or higher. Where mixtures of a nitrogen oxide (nitric oxide or nitrogen dioxide) and oxygen are utilized, the oxygen is preferably supplied in amounts ranging from 2 to 10 mols of oxygen per mol of nitrogen oxide.

In carrying out this process, the space velocity of reactants is not critical and may vary over wide limits. The gaseous hourly space velocity (GVHSV), i.e., volume of gas charged per unit volume of catalyst per hour, may vary from 50–2000 or higher. In this process any materials of construction may be used which are resistant to attack by the reactants or the reaction products under the conditions of operation.

In obtaining a maximum sustained yield of cyanogen, it may be desirable to use a reaction system as described by Fierce and Sandner in their copending patent application, Serial Number 852,444, now Patent No. 3,020,126. In that system, two or more reactors are provided which contain a catalyst for effecting oxidation of hydrogen cyanide, with an intermediate zone being provided in which the by-product water of reaction is condensed and withdrawn, and additional oxygen supplied prior to passage of the dehydrated reaction mixture into the next catalyst zone. In this manner the conversion of hydrogen cyanide to cyanogen is increased, and by recycling the resulting nitric oxide and any unconverted hydrogen cyanide to the initial reaction zone, a cyclic process is established in which only hydrogen cyanide and oxygen are fed to the initial reaction zone, together with sufficient nitric oxide to make up for losses.

The following non-limiting examples are illustrative of the scope of this invention.

*Example I*

A 223-g. portion of alumina hydrogel (having a surface area of about 200 m.$^2$/g.) which had been dried for 24 hours at 110° C. (to a water content of about 10%) was slurried into 360 ml. of an aqueous solution containing 538 g. of magnesium nitrate hexahydrate. To this slurry, 180 ml. of aqueous solution containing 31.1 ml. of 28% ammonium hydroxide were added, with agitation, and the agitation was continued for 0.5 hour. Then the slurry was filtered and the filter cake was dried overnight at 110° C. The dried filter cake was calcined for 6 hours at 400° C., which was sufficient to effect a chemical interaction between the magnesium oxide and surface hydroxyl groups in the alumina gel. The resulting catalyst was mixed with 1% graphite and formed into ⅛″ pellets. The catalyst pellets were treated by heating for about 21 hours at 400° C. under a small flow of nitrogen to insure completion of reaction between the magnesium oxide and the catalyst support. The catalyst was then evaluated in the oxidation of hydrogen cyanide to cyanogen using a mixture of nitric oxide and oxygen. The reaction was carried out at a temperature of about 200°–210° C., a hydrogen cyanide gaseous hourly space velocity of 92, and a hydrogen cyanide-nitric oxide-oxygen ratio of 2.5/1.0/5.0.

Under these reaction conditions, hydrogen cyanide was converted to the extent of 96.1%. Cyanogen was obtained in a yield of 72.1% and a selectively of 75%.

*Example II*

In another experiment, a 223-g. portion of the alumina hydrogel used in Example I was slurried into 360 ml. of an aqueous solution containing 35.7 g. of silver nitrate. To this slurry, 180 ml. of an aqueous solution containing 13.5 g. of ammonium chloride were added, with agitation. Agitation was continued for 0.5 hour after the addition was completed. The slurry was filtered and the filter cake was washed with three separate 250-ml. portions of distilled water. The wet cake was dried overnight at 110° C., and the dried cake was calcined for 6 hours at about 400° C. The resulting catalyst was mixed with 1% graphite and formed into 1/8" pellets. The catalyst pellets were pretreated by heating for about 21 hours at about 400° C. under a slow flow of nitrogen. The preliminary heating of the catalyst and the pretreatment of the catalyst pellets is effective to cause a chemical interaction between the silver oxide which is formed and the hydroxyl groups on the surface of the alumina gel. As a result, the silver is combined with the catalyst support through an oxide linkage. The catalyst which was thus prepared was evaluated in the oxidation of hydrogen cyanide using a mixture of nitric oxide and oxygen as the oxidant. The reaction was carried out at a temperature of about 280–290° C., at a hydrogen cyanide gaseous hourly space velocity of 95, and a hydrogen cyanide-nitric oxide-oxygen ratio of 3.3/1.0/1.8.

Cyanogen was obtained in a yield of 71.7% and selectivity of 71.7%.

*Example III*

In another experiment, a 135-g. portion of 8–14 mesh Alcoa F-10 activated alumina, having a surface area of 140 m.$^2$/g., was impregnated with 60 ml. of aqueous solution containing 32.1 g. of magnesium chloride hexahydrate. The resulting mixture was dried overnight at 110° C. and subsequently calcined for one hour successively at each of the following temperatures: 204° C., 260° C., 371° C., 420° C., 482° C., and then for 3 hours at 528° C. This catalyst was evaluated in the oxidation of hydrogen cyanide using nitrogen dioxide. The reaction was carried out at a temperature of about 265–275° C. at atmospheric pressure. Hydrogen cyanide was fed at a gaseous hourly space velocity of 100, and a hydrogen cyanide-nitrogen dioxide mol ratio of 2.4 was used. The hydrogen cyanide was fed to the reactor in a stream of nitrogen by using a nitrogen saturator. No cyanogen was produced in this reaction although 76% of the hydrogen cyanide was consumed.

Example III demonstrates the fact that when a high-surface-area catalyst-support is used, the catalyst is too active and oxidizes the hydrogen cyanide to carbon dioxide and water unless the catalyst promoter is chemically combined with the support.

*Example IV*

In order to demonstrate the superior activity of the catalyst of this invention over a catalyst in which a low-surface-area support was used, a catalyst was prepared by impregnating 450 g. of 8–16 mesh Italian pumice (surface area 0.3 m.$^2$/g.) with 250 ml. of an aqueous solution containing 107 g. of magnesium chloride hexahydrate. The wet catalyst mixture was dried overnight at 110° C. and then calcined for one hour successively at 204° C., 260° C., 371° C., 427° C., 482° C., and for three hours at 538° C. This catalyst was evaluated in the oxidation of hydrogen cyanide utilizing a mixture of nitric oxide and oxygen as the oxidant. The reaction was carried out at about 275°–285° C. and atmospheric pressure. The hydrogen cyanide was introduced using a helium saturator at a hydrogen cyanide space velocity of 27. In the reaction, a hydrogen cyanide-nitric oxide-oxygen ratio of 2.0/1.0/8.6 was used.

Under the above-mentioned reaction conditions, hydrogen cyanide was consumed to the extent of only 67.8%. Cyanogen was obtained in a yield of 53.2% and selectivity of 78.5%.

From the foregoing examples, we have established that hydrogen cyanide can be oxidized to cyanogen at high yield and high selectivity, without deterioration of catalyst activity on extended use, using nitrogen oxides (alone or in a mixture with oxygen) as the oxidant by utilizing a catalyst having a high surface area (in excess of about 75 m.$^2$/g.) in which a promoter metal is chemically combined with the catalyst support through an oxide linkage. When catalysts are prepared in this manner, using other high-surface-area refractory oxide supports, e.g., activated alumina, silica gel, silica-alumina, silica-zirconia, silica-titania, silica-boria, etc., catalysts are obtained which have very high activity and selectivity for formation of cyanogen from hydrogen cyanide. In the preparation of these catalysts, an oxide, hydroxide, or decomposable salt of a metal of group I or group II or of chromium, molybdenum, manganese, iron, or nickel is deposited in intimate contact with the refractory oxide support and calcined at a temperature of about 260°–540° C. for a time sufficient to effect completion of reaction between the impregnant and the support. In preparing the catalyst, the refractory oxide support is preferably mixed with an aqueous solution of a salt of any of the aforementioned metals and converted to the oxide or hydroxide form by treatment with ammonium hydroxide. The refractory support with the metal oxide or hydroxide precipitated therein is subsequently calcined to effect a chemical reaction with the surface hydroxyl groups in the support. This catalyst can be used in the oxidation of hydrogen cyanide using nitrogen dioxide, oxygen-nitrogen dioxide mixtures, and oxygen-nitric oxide mixtures as the oxidant, preferably at temperatures of about 100°–400° C. The activity and selectivity of the catalyst for formation of cyanogen remains high over extended periods of operation.

While we have described our invention fully and completely with special emphasis upon several preferred embodiments, we wish it to be understood that within the scope of the appended claims, the invention may be practiced otherwise than as described herein.

The embodiments of the invention in which an exclusive property or privilege is claimed are defined as follows:

1. A process for the preparation of cyanogen which comprises passing a mixture of hydrogen cyanide and an oxidant selected from the group consisting of $NO_2$, $O_2$-$NO_2$ mixtures, and $O_2$-NO mixtures, at a temperature of about 100°–400° C., sufficient to effect reaction between the oxidant and hydrogen cyanide, over a catalyst prepared by impregnating a refractory oxide support having a B.E.T. surface area in excess of about 75 m.$^2$/g., and a water content not less than about 5% wt. with a compound selected from the group consisting of thermally decomposable salts, oxides, and hydroxides of metals of group I and II of the periodic table, chromium, molybdenum, manganese, iron, and nickel, to a metal content of 0.5–15.0% wt., and calcining the catalyst at 260°–540° C. for a time sufficient to effect completion of reaction between the impregnant and the support.

2. A process in accordance with claim 1 in which the refractory oxide support is selected from the group consisting of silica gel, alumina, and refractory mixed-oxides gels.

3. A process in accordance with claim 1 in which the hydrogen cyanide is present in a substantial molar excess over the nitrogen oxide.

4. A process in accordance with claim 1 in which the gaseous hourly space velocity of reactants is in the range of about 50–2000.

5. A process in accordance with claim 1 in which the catalyst impregnant is magnesium hydroxide.

6. A process in accordance with claim 1 in which the catalyst impregnant is silver oxide.

7. A process for the preparation of cyanogen which comprises passing a mixture of hydrogen cyanide and an oxidant selected from the group consisting of $NO_2$, $O_2$-$NO_2$ mixtures, and $O_2$-NO mixtures, at a temperature of about 100°–400° C., sufficient to effect reaction between the oxidant and hydrogen cyanide, over a catalyst prepared by mixing an alumina hydrogel with an aqueous solution of a magnesium compound, precipitating magnesium hydroxide in the alumina gel and calcining the impregnated catalyst at about 400° C. until reaction between the impregnant and support is complete.

8. A process for the preparation of cyanogen which comprises passing a mixture of hydrogen cyanide and an oxidant selected from the group consisting of $NO_2$, $O_2$-$NO_2$ mixtures, and $O_2$-NO mixtures, at a temperature of about 100°–400° C., sufficient to effect reaction between the oxidant and hydrogen cyanide, over a catalyst prepared by impregnating an alumina hydrogel with silver oxide and calcining the catalyst at about 400° C. until reaction between the impregnant and the support is complete.

References Cited in the file of this patent

UNITED STATES PATENTS

| | | |
|---|---|---|
| 2,839,475 | Innes | June 17, 1958 |
| 2,884,308 | Fierce et al. | Apr. 28, 1959 |